Sept. 8, 1936. W. A. EATON 2,053,272
STEERING MECHANISM
Filed June 22, 1934 3 Sheets-Sheet 3
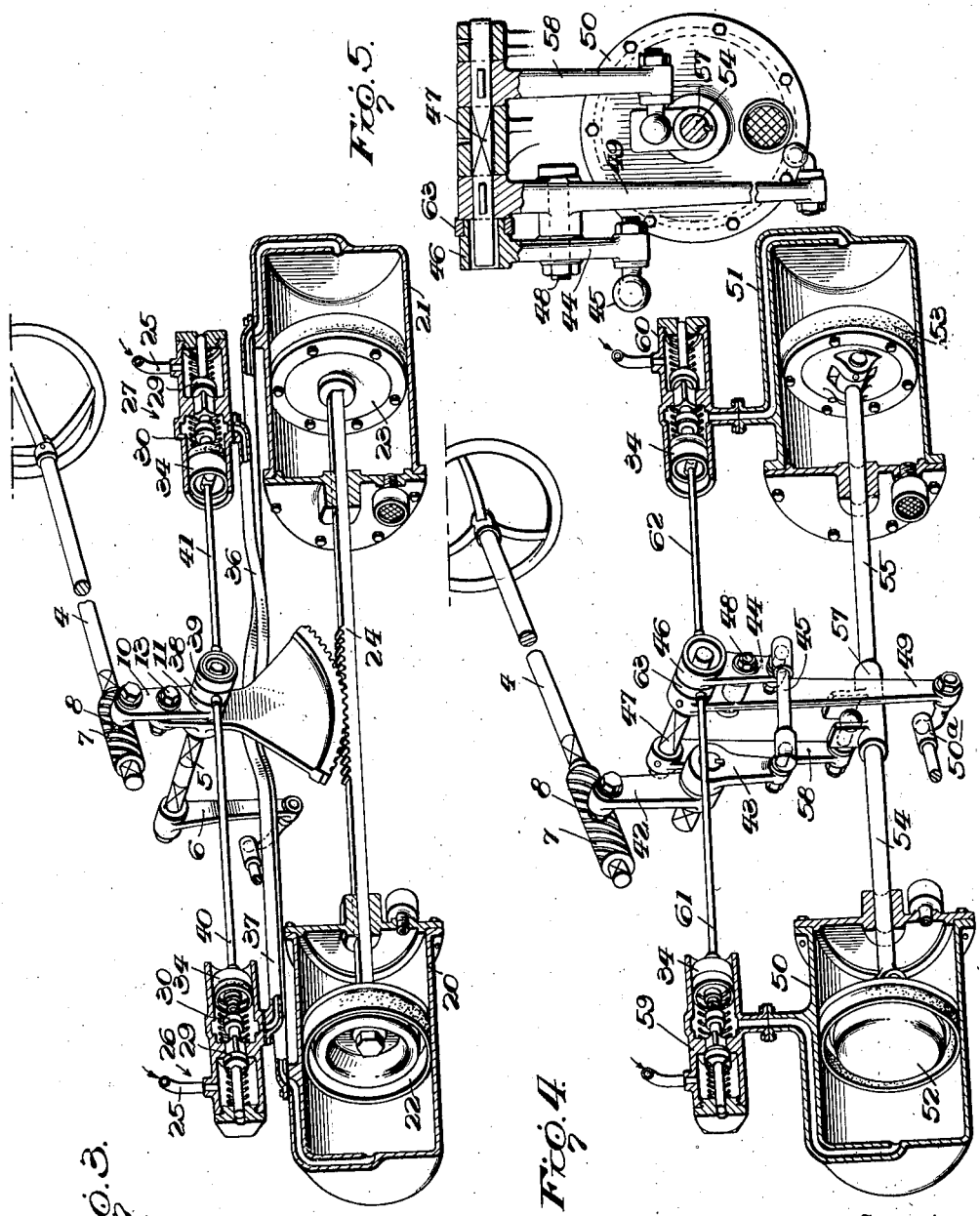

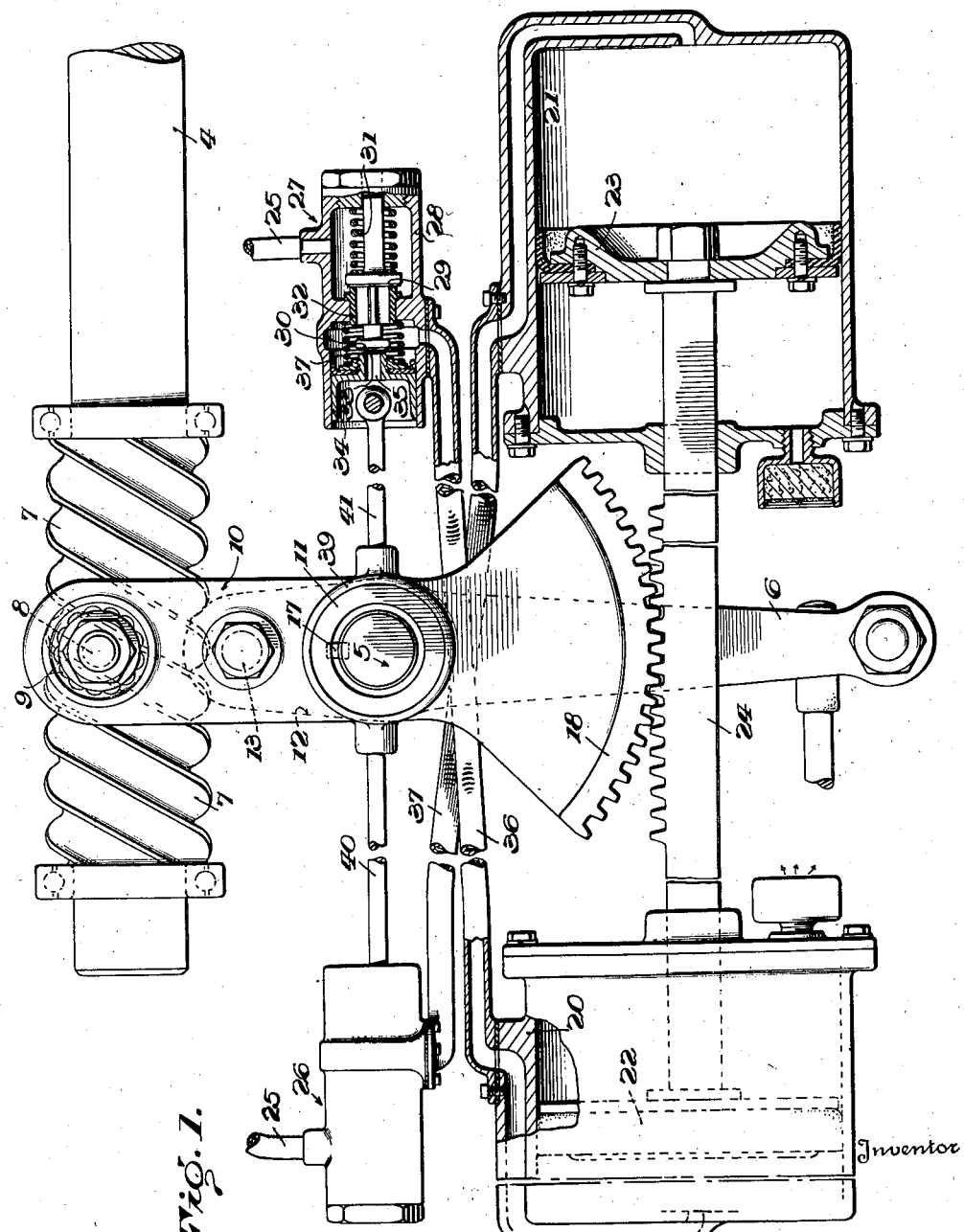

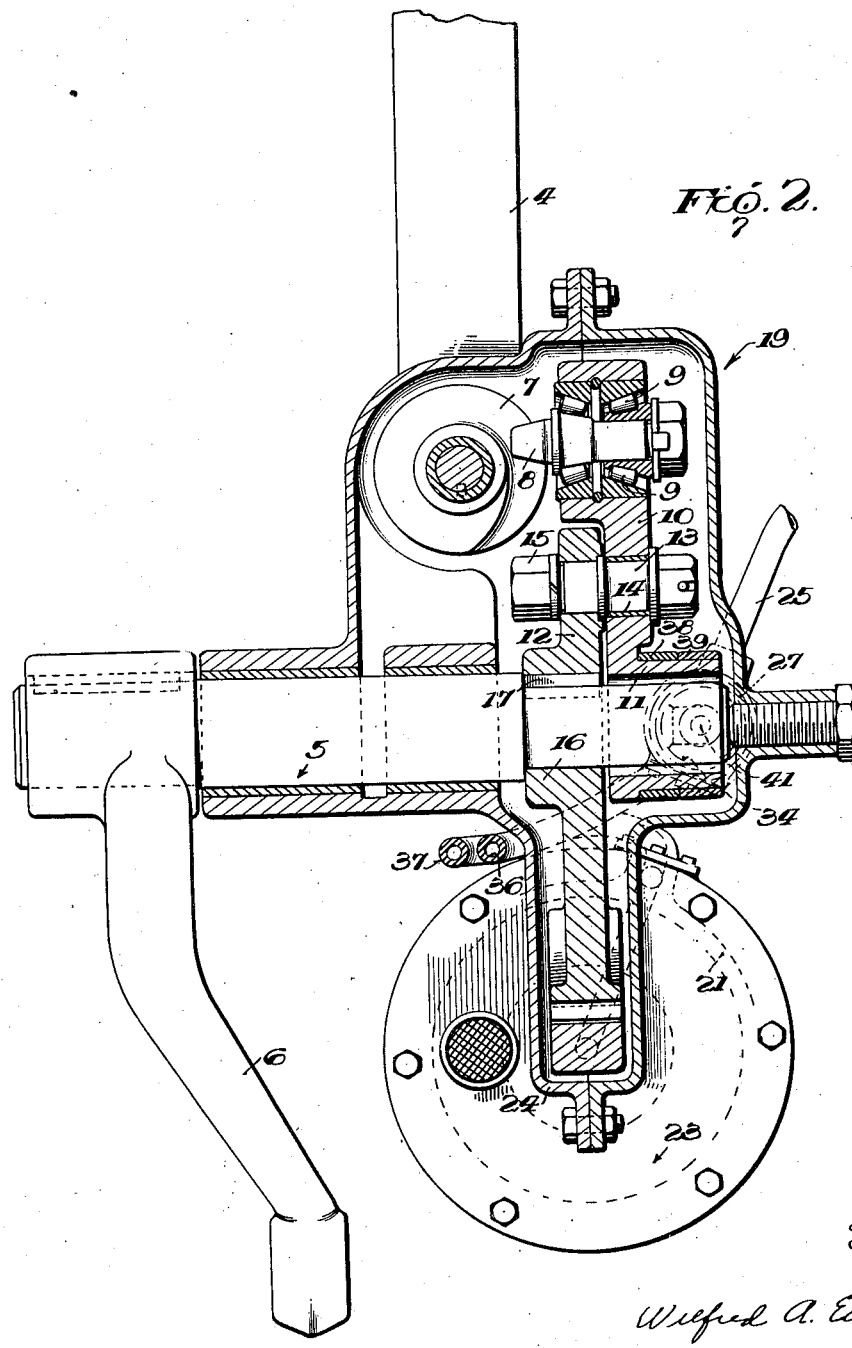

Patented Sept. 8, 1936

2,053,272

UNITED STATES PATENT OFFICE 2,053,272

STEERING MECHANISM

Wilfred A. Eaton, Pittsburgh, Pa., assignor to Bendix-Westinghouse Automotive Air Brake Company, Pittsburgh, Pa., a corporation of Delaware Application June 22, 1934, Serial No. 731,986

12 Claims. (Cl. 180—79.2)

This invention relates to steering mechanism and more particularly to power-operated steering mechanisms adapted for use in connection with vehicles having dirigible wheels.

One of the objects of the present invention is to provide a novel power-operated steering mechanism which is especially adapted for use in connection with motor vehicles.

Another object of the invention is to provide in a motor vehicle steering apparatus a novel construction whereby the operator may readily steer motor vehicles of the larger type, such as trucks or busses, with a minimum amount of effort and at the same time have complete control of the steering of such vehicles as heretofore.

Still another object is to provide a novel power steering mechanism for motor vehicles so constituted as to enable manual control of the steering operation to effect a combined manual and power steering operation.

A further object is to provide in a mechanism of the above character, a novel arrangement of parts whereby manually controlled power operation of the steering apparatus will include a feel or reaction which will be reflected in the manually controlled member in order to simulate as closely as possible the feel or resistance heretofore encountered during manual steering.

A still further object is to provide in a power-operated steering mechanism for motor vehicles, a novel, simple and compact arrangement of parts so constituted as to be relatively light in weight and capable of ready installation without the necessity of completely rebuilding manually-operated steering mechanisms now in common use.

The above and other novel features of the invention will appear more fully hereinafter from the following detailed description when taken in connection with the accompanying drawings, wherein there are illustrated two embodiments of the invention. It is to be expressly understood, however, that the drawings are for purposes of illustration only and are not designed as a definition of the limits of the invention, reference being had for this purpose to the appended claims.

In the drawings, wherein similar reference characters denote similar parts throughout the several views:

Fig. 1 is a side view, partly in section, of a power steering apparatus constructed in accordance with the present invention;

Fig. 2 is a transverse sectional view of the parts shown in Fig. 1;

Fig. 3 is a diagrammatic perspective view of the parts shown in Figs. 1 and 2;

Fig. 4 is a perspective view of a modified form of the invention, and

Fig. 5 is a side view in section of the controlling levers shown in Fig. 4.

Referring more particularly to Figs. 1 and 2, the present invention is illustrated therein as including a manually-operable steering column or shaft 4, which is drivably connected by means hereinafter to be described to a rotatable steering shaft or member 5 having rigidly secured at one end thereof a pitman arm 6 which is adapted to be connected with a drag link and suitable steering connections, not shown, in order to steer the dirigible wheels of a motor vehicle.

Suitably secured to one end of the steering column 4 is a worm or cam 7 of well-known construction, with which there is adapted to mesh a cam follower or gear member 8 rotatably carried as by means of bearings 9 by one end of a lever 10, the other end of which is formed into a hub portion 11 which surrounds but is spaced from a reduced end of the steering shaft 5. As shown, the lever 10 is pivotally connected intermediate its ends to one end of a lever 12 by any suitable means such as pivot pin or bolt 13, and in order to insure free pivotal movement of lever 10 with respect to the bolt 13, a bushing 14 may be interposed therebetween. As viewed in Fig. 2, the left-hand portion of the bolt 13 is fixedly secured to the upper end of lever 12 as by means of drawing nut 15 tightly against the face of the lever.

In the form of the invention illustrated, the lever 12 is provided with a hub portion 16 which is suitably secured to the shaft 5 as by means of a key 17, it being apparent that rotation of lever 12 will thereby effect rotation of the steering shaft 5 and consequent operation of the steering mechanism operatively connected thereto. The lever 12 preferably extends below shaft 5, as viewed in Fig. 2, and the lower end portion is formed as a gear segment 18, see Fig. 1, with which a fluid motor is adapted to cooperate in order to provide power operation of the steering mechanism. Preferably, the mechanism above described is enclosed within a suitable casing 19.

In order to effect operation of the steering mechanism by power, there is provided a suitable power-actuating mechanism comprising opposed cylinders 20 and 21 having reciprocable pistons 22 and 23 therein, the said pistons being interconnected by a rack 24 in constant meshing engagement with the gear teeth of sector 18. Preferably, the power-actuating mechanism is adapted to be actuated in accordance with air under pressure although as well understood by those skilled in the art, any suitable fluid may be employed. As shown, air under pressure is conducted to the mechanism through pipes 25 from a suitable air reservoir, not shown, the control of compressed air to the cylinders being effected by valve mechanisms 26 and 27 associated with cylinders 21 and 20 respectively. Referring to the valve mechanism 27, it will be observed that the same includes a casing 28 having intake and exhaust valves 29 and 30 secured together and reciprocatingly mounted therein, there being provided resilient means 31 for normally maintaining the valve 29 upon a seat 32 secured to the casing. The exhaust valve 30, as shown, is normally spaced from its seat 33 formed in the head of a reciprocating piston member 34, this last-named member having a bore 35 formed therein which normally establishes communication between one side of the fluid motor and at atmosphere through duct 36 associated with the cylinder 20. Preferably, a spring 37 is interposed between the casing 28 and the piston 34 in order to maintain the latter in such a position that the bore 35 will not be closed by the valve 30. The valve mechanism 26 is constructed in a manner similar to the valve mechanism 27.

In order to effect operation of the valve mechanisms 26 and 27, the hub portion 11 of the lever 10 has rotatably mounted thereon a pair of collars 38 and 39, the former being connected to the valve mechanism 26 by means of a rod 40, while the latter is adapted to actuate the valve mechanism 27 through rod 41.

In operation, manual rotation of shaft 4 and cam 7 will effect operation of lever 10 about pivot 13 by reason of the engagement of the cam follower 8 with the cam 7, such pivotal movement of the lever 10 being limited by the spaced or lost motion connection between the hub portion 11 of lever 10 and the reduced end of steering shaft 5. As viewed in Figs. 1 and 3, such operation of lever 10 will effect movement of collar 39 and rod 41 to the right, for example, compressing spring 37 and effecting a closure of the bore 35 as soon as the seat 33 contacts with valve 30. Subsequent movement of the rod 41 to the right will serve to open the intake valve 29 against the tension of spring 31 in order to permit air or other fluid under pressure to be conducted into the power cylinder 20 through pipe 25 and duct 36, whereupon the piston 22 and rack 24 will be moved to the right to effect a counter-clockwise movement of the gear sector 18 and steering shaft 5 whereupon the dirigible wheels will be moved in the desired direction. It will be readily apparent that during the above-described movement of the gear sector 18, the lower end portion of lever 10, together with the collars 38 and 39, will be moved to the left, as viewed in Figs. 1 and 3, by reason of the substantially self-locking nature of the worm or cam 7 and by reason of the connection between the upper portion of lever 12 with the lever 10 intermediate the ends of the latter. Such movement of the collar 39 to the left will cause a corresponding movement of the valve-operating rod 41 to the left, thus enabling spring 31 to close the intake valve 29 and upon continued movement of the collar 39 to the left, communication between the power cylinder 20 and atmosphere will be established through connections 36 and 35. It will also be observed that as soon as the above communication to the atmosphere has been established, the power cylinder 20 will become inoperative and no further movement of the steering mechanism will be effected by power.

Preferably, the springs 37 of the valve mechanisms are so constructed as to readily yield during the usual operation of the steering mechanism in order to permit the functioning of the power apparatus. However, under certain circumstances it may be desirable to steer the vehicle manually, in the usual manner, and to permit the power apparatus to become operable only when a predetermined resistance to steering is encountered, such as for example, during travel in sandy or muddy roads, such an operation obviously conserving the supply of compressed air required to be carried by the vehicle. In such event it is only necessary to construct the springs 37 in such a manner that they will oppose the tendency of the valve operating rods 40 and 41 to compress them, during operation of the steering mechanism when only slight resistance to steering is encountered, but will yield as soon as a predetermined resistance is reached, thereby permitting operation of the power apparatus.

It will be appreciated from the above that the construction of the parts is such as to enable a feel or resistance to steering to be reflected in the steering shaft 4 in order to convey to the operator the usual reaction to steering encountered during normal operation of steering gears of the manually-operated type, which reaction is highly desirable in steering mechanisms operated by power. For example, as soon as the lost motion existing between the hub portion 11 of the lever 10 and the reduced end of shaft 5 has been taken up and air under pressure is being conveyed to the power cylinder 20, it will be observed that pressure will be exerted upon the right-hand portion of piston 34 tending to move the latter, together with rod 41 and collar 39, to the left, which in effect tends to rotate the lever 10 in a clockwise direction about pivot 13 thus exerting a certain predetermined resistance to the turning of the cam 7 when operated to effect a steering of the dirigible wheels of the vehicle. Thus, substantially simultaneously with the actuation of the steering shaft 4 by the operator to effect a movement of the upper end of lever 10 to the left, as viewed in Fig. 1, the operation of the valve mechanism will cause a reaction to be exerted which is conveyed to the operator through the steering shaft 4. Such an arrangement is extremely advantageous, as will be appreciated, in that the usual resistance or reaction offered to steering may be readily noted by the operator.

In the event that the operator wishes to steer the wheels of the vehicle in an opposite direction, the steering shaft 4 is moved in such a manner that the upper end of lever 10 will be moved to the right, as viewed in Figs. 1 and 3, thus effecting operation of valve 26 to supply fluid under pressure through pipe connections 25 and 37 to the power cylinder 21 which will effect a clockwise rotation of gear segment 18 and steering shaft 5 and upon a predetermined movement of the latter, will effect a discontinuance in the operation of the power cylinder in a manner similar to that above described in connection with power cylinder 20. It is to be pointed out that the construction is such that as soon as the lost motion between hub portion 11 of lever 10 and the reduced end of steering shaft 5 has been taken up and the selected power cylinder has been placed in operation, continued rotation of the cam 7 will also add the manual effort of the operator to the power operation of steering shaft 5 by reason of the abutting engagement between hub 11 and shaft 5 effecting a connection between the cam follower 8, levers 10 and 12 and shaft 5.

Referring more particularly to Fig. 4, a slightly modified form of the invention is disclosed therein and includes a lever 42, one end thereof being cam operated by the steering column 4 while the other end is rotatably mounted on the vehicle frame in any suitable manner. Said last named end is also connected with a lever 43 which latter is associated with one end of a valve controlling lever 44 as by means of a link 45. As shown more particularly in Fig. 5, the valve controlling lever is provided with a hub portion 46 surrounding but spaced from the end portion of the rotatable steering shaft 47, while the intermediate portion of said lever is pivotally connected, as by means of a pivot pin or bolt 48, to a pitman arm or lever 49, one end of the latter being fixedly secured to the rotatable shaft 47. As shown in Fig. 4, the lower end of the pitman arm 49 is secured to a drag link and steering connections 50ª of suitable design, it being understood that oscillating movement of arm 49 in accordance with rotation of the steering shaft 47 will effect steering of the dirigible wheels of the vehicle through the steering connections 50ª depending upon the direction of movement of the steering column 4.

Means are provided for operating the steering shaft 47 by power, and preferably such power means are controlled by operation of the steering column 4. As shown, such means are constituted by power cylinders 50 and 51 having pistons 52 and 53 respectively, which are interconnected by means of rods 54 and 55, the means for interconnecting such rods comprising a suitable coupling member 57 which is connected to the lower end of arm 58, the upper end of which is secured to the steering shaft 47. Any suitable source of fluid, such as air under pressure, is adapted to be conducted to the power cylinders by valve mechanisms 59 and 60, such valve mechanisms being similar in construction to the valve mechanism 27 heretofore fully described in connection with that form of the invention illustrated in Figs. 1–3. As shown, the valve mechanisms 59 and 60 are provided with operating rods 61 and 62 which are connected with a collar 63 rotatably mounted upon the hub portion 46 of lever 44.

During operation of the above described modified form of the invention, considering the steering column to be turned in such a direction as to effect a counterclockwise movement of link 43 with respect to the mounting thereof on the vehicle frame, it will be readily observed that link 45 will be moved to the right effecting a counterclockwise movement of lever 44 about its pivot 48, which latter, it will be appreciated, momentarily remains stationary, since the same is connected through arm 49 to the dirigible wheels of the vehicle. Upon the counterclockwise movement of lever 44, it will be readily observed that the hub portion 46 of said lever, together with collar 63 rotatably mounted thereon, will be moved to the left, as viewed in Fig. 4, taking up the lost motion existing between hub portion 46 and the rotatable steering shaft 47, such movement effecting operation of the valve 59 to admit fluid under pressure to power cylinder 50 which will cause rod 54 to move to the right in order to effect power operation of the pitman arm 49 through lever 58 and rotatable shaft 47. It will also be readily observed that the valve mechanism 59 will be rendered inoperative by counterclockwise movement of lever 49 with shaft 47 by reason of the interconnection between the pitman arm 49 and the lever 44 at 48, such connection effecting a movement of the hub portion 46 to the right, it being appreciated that the lower end of lever 44 secured to the link 45 will remain substantially stationary. In this form of the invention as in the previously described form, continued rotation of the cam 7 by the operator will, after the lost motion between hub 46 and the steering shaft 47 has been taken up to operate the selected fluid cylinder, enable the manual effort of the operator to be added to the power operation of the steering mechanism. It is also to be understood that in this form of the invention the valve mechanisms 59 and 60 are of the fluid pressure reactive type similar to the valves 26 and 27 and both of the valve mechanisms disclosed in Fig. 4 include the pressure responsive element 34 subjected to the pressure of the fluid supplied the cylinder and which reacts through the pivotally mounted members 44 and 49 to apprise the operator of the degree of power required for steering.

There is thus provided by the present invention a power steering mechanism of relatively few parts, so constituted as to be capable of ready installation upon motor vehicles with a minimum amount of rearrangement of the steering apparatus thereon. The provision of the lost motion in the steering operating linkage enables ready actuation of the valves controlling the flow of fluid under pressure to the power actuators and moreover provides a construction whereby the manual effort of the operator may readily supplement the power operation of the steering mechanism. The arrangement of these valves and of the power actuators, as above described, is also of such a nature as to enable a reaction or resistance to be exerted upon the manually-operable steering shaft which is readily noticeable by the operator when rotating such shaft, to the end that the operator may more readily gauge the degree of steering as in steering mechanism of the manually-operable type.

While only two embodiments of the invention have been illustrated and described, it is to be understood that the invention is not limited thereto but may be capable of being employed in other forms as well understood by those skilled in the art. Furthermore, the parts disclosed herein may be rearranged if desired, and certain of the parts may be used without others without departing from the spirit of the invention. Reference will therefore be had to the appended claims for a definition of the limits of the invention.

This application is a continuation in part of application Serial No. 609,018, filed May 3, 1932, in the names of Wilfred A. Eaton and Stephen Vorech.

What is claimed is:

1. A motor vehicle power steering mechanism having a rotatable cam, a rotatable steering shaft, means including a pair of pivotally connected levers for drivably connecting said cam and shaft, a fluid motor operatively connected with one of said levers, and means dependent upon pivotal movement of one lever with respect to the other lever for controlling the operation of said motor.

2. A motor vehicle power steering mechanism having a manually-rotatable cam, a steering shaft, a member drivably connected at one end with said cam and having a lost motion connection at its other end with said shaft, a second member drivably connected with said shaft, means for pivotally connecting said first member intermediate its ends with said second member, a fluid motor operatively connected with said second member, and means dependent upon pivotal movement of said first member to take up said lost motion for controlling the operation of said motor.

3. In a power steering mechanism for vehicles, a steering shaft, a fluid motor for rotating said shaft, means including a manually operable steering column for controlling the motor, and a mechanical connection between the steering shaft and the manually operable device comprising a pair of pivotally-connected members.

4. In a power steering mechanism for vehicles, a steering shaft, a fluid motor for rotating said shaft, a manually operable device for controlling the motor, and a mechanical connection between the steering shaft and the manually operable device comprising a pair of pivotally-connected members, one of said members being rigidly secured to said shaft, the other of said members having a part surrounding but spaced from said shaft.

5. In a power steering mechanism for motor vehicles, a pair of angularly disposed shafts, a fluid motor for rotating one of said shafts, means for manually rotating the other of said shafts, a steering mechanism connected with the motor-driven shaft, and means for controlling the operation of said motor comprising a member connected with said manually rotatable shaft and pivotally connected with said motor-driven shaft.

6. A power steering mechanism having a manually rotatable shaft, a cam on said shaft, a rotatable steering shaft, a lever rigidly secured to said steering shaft, a second lever having a cam follower secured thereto at one end thereof adapted to cooperate with said cam, said second lever being connected to a member having a hub portion surrounding but spaced from said steering shaft, means for pivotally connecting said first lever to said member between the ends thereof, a fluid motor operatively connected with the steering shaft, valve mechanism for controlling the operation of said motor, and means interconnecting said hub portion of said member with said valve mechanism.

7. In a steering mechanism of the type having a manually operable controlling member and a power-operated steering lever, the combination with said member, of means for controlling the power operation of said lever comprising an oscillatable lever having one end thereof connected with said member, means on said steering lever for pivotally mounting said oscillatable lever, and means including a shaft associated with the other end of said oscillatable lever through a lost motion connection for limiting the oscillatable movement of the last named lever in either direction about its pivotal mounting.

8. In combination with a manually rotatable shaft, a steering member, a fluid motor operatively connected with said steering member, valve mechanism for controlling said motor, and means for operatively connecting said shaft and member and for controlling said valve mechanism to effect combined manual and power operation of said steering member comprising a lever operatively connected with said steering member, a motor-control lever pivotally mounted intermediate its ends to said first-named lever, one end of said motor-control lever being operatively connected with said manually rotatable shaft independently of said first named lever, means for connecting the opposite end of said control lever to said valve mechanism, and means for mounting said last-named end for limited pivotal movement with respect to said first-named lever.

9. In a vehicle steering apparatus, having dirigible wheels for varying the direction of motion of a vehicle, a steering shaft, steering mechanism connecting the steering shaft with said wheels whereby rotation of the shaft moves the wheels to vary the direction of motion of the vehicle, a fluid motor connected to the steering shaft and serving to rotate the same, a conduit for supplying fluid under pressure to said motor, a valve normally closing said conduit, a steering wheel, means including a lever fulcrumed intermediate its ends connected with said steering wheel and having one end surrounding said steering shaft, said end being operatively associated with said valve whereby rotation of said wheel moves said valve to open said conduit, and means directly connecting said fulcrum and said steering shaft whereby movement of the steering shaft in response to actuation thereof by said motor moves said fulcrum in a direction to close said valve.

10. In a power steering mechanism for motor vehicles, a manually-operable steering member, a power operated steering lever, a power device having a movable element connected with said steering lever, and means for controlling said power device from said manually-operable steering member comprising a controlling lever fulcrumed intermediate its ends on said steering lever, a connection between said manually-operable steering member and one end of said controlling lever, and a member for mounting the other end of said controlling lever, said other end encircling said last named member but normally spaced therefrom to provide a lost motion connection, said power operated steering lever being secured adjacent one end thereof to said last named member.

11. In a power steering mechanism for motor vehicles, a manually-operable steering member, a power operated steering lever, a power device having a movable element connected with said steering lever, and means for controlling said power device from said manually-operable steering member comprising a controlling lever fulcrumed intermediate its ends on said steering lever, a connection between said manually-operable steering member and one end of said controlling lever, and a member for mounting the other end of said controlling lever, said other end encircling said last named member but normally spaced therefrom to provide a lost motion connection, said power operated steering lever being mounted on said last named member.

12. In a power operated steering mechanism for motor vehicles, a manually-operable steering shaft, a rotatable steering shaft, power means connected with said shaft, a pitman arm also connected with said shaft, power controlling means for said power means, a lever oscillatably mounted on said arm for actuating said power controlling means, and means connecting said shaft and lever.

WILFRED A. EATON.